Patented Nov. 3, 1953

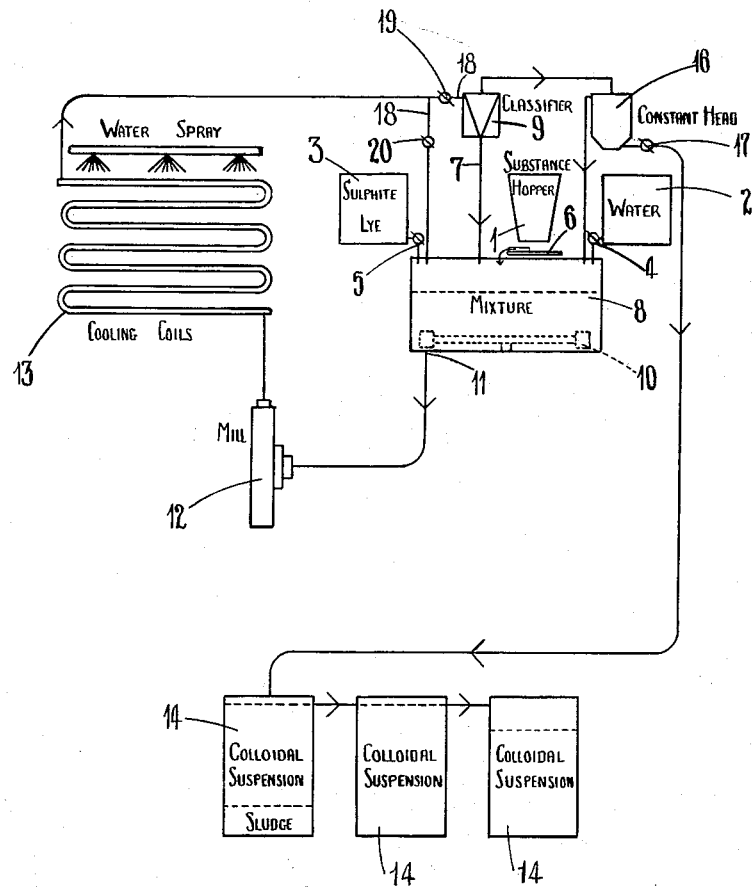

2,658,016

UNITED STATES PATENT OFFICE 2,658,016

PRODUCTION OF FINE AQUEOUS DISPERSION OF SULFUR

Laurie Oakley Brown, Oamaru, Otago, and Tasman Joseph McKee, Port Mapua, Nelson, New Zealand Application August 31, 1948, Serial No. 47,084

4 Claims. (Cl. 167—20)

This invention relates to apparatus and processes for the production of concentrated solids in liquid suspensions or redispersible solid materials from sulphur, or from dichloro-diphenyl-trichlorethane, or from like substances (which where not otherwise qualified are herein referred to as a "substance"), and this invention is more particularly concerned with the comminution of any such substance and its preparation with added ingredients into concentrated suspensions or redispersible materials for useful purposes such as a fungicide and/or insecticide or as may be desired.

It is now recognized that some materials in the form of cakes and/or powders, or suspensions in which the particles are in a very fine state of subdivision and having a minor proportion of particles above five (5) microns in diameter are valuable for use in many industries, such as for pigments, accelerators, antioxidants for rubber, delustering compounds for rayon, fillers for a variety of purposes such as paints, paper manufacture, rubber, cosmetics and many pharmaceutical preparations; and also as the active compounds of fungicides, insecticides, preservatives and weedicides; and all of which and many other uses require materials of such particle size; and in this specification the terms "very fine" and "finely divided" refer specifically to those substances having a minor proportion of particles above (5) microns in diameter and generally not exceeding (10%) ten percent by weight of the particles of the solid content.

Prior to this invention, however, the use of such materials of desired particle size has been restricted by the high cost in carrying out previously proposed processes of the comminution, then the classification and finally the concentration of such materials.

Prior hereto many methods and apparatus have been proposed to overcome the difficulties and high cost involved in the preparation of fine materials.

It has been proposed previously hereto to dissolve solids in one of two immiscible liquids, only one of which is a solvent for the solid to be size reduced, and further to emulsify the solution in the other liquid, and subsequently removing the solvent by distillation. It is generally found, however, that such emulsions are unstable during distillation, the solvents are of high cost and the method was difficult of general application, although methods of stabilising the emulsions and suspensions have been proposed.

With certain types of solids it has been proposed to melt the solid and to emulsify the fused solid in a liquid, and by subsequent cooling thus to obtain the finely suspended solid. As many solids have temperatures above the boiling point of water under normal pressures, the use of an expensive suspending liquid or the use of complicated apparatus has been found necessary to carry out the emulsification under such elevated or high temperatures and pressure. Methods of stabilising the emulsions and suspensions have been proposed.

Further it has been proposed to chemically precipitate from solutions many materials such as calcium carbonate from bicarbonate solution, sulphur by acidulation of polysulphides of ammonia or an alkali metal, hydrated titanium dioxide from acid titanium sulphate solutions; and then to stabilise the state of subdivision and dispersion of the precipitated solids. Such chemical methods of preparation involve a further step of concentration and/or separation from the suspending liquid and resulting by-products of the reaction which is a disadvantage in economical production.

It is known also to comminute solid materials by subjecting the solids in the presence of water to the grinding action of balls in Alsing cylinders, tube mills and the like and to use stabilising agents and protective colloids to prevent reassociation or agglutination of the fine solids.

Then again it has been known to use colloid mills in which the particles in liquid suspension are broken by shear transmitted by the suspending liquid on passing between a revolving plate and a stationary plate, or by two plates revolving in opposite directions with the surfaces of revolution being spaced usually below 0.020 inch and may be at 0.002 inch or less. The surfaces of the colloid mills may be smooth or corrugated or otherwise shaped. In such colloid mills, previously hereto, the efficiency of the colloid mill is stated to be increased, with increase in shear due to (a) higher relative velocities of the surfaces, and (b) reduction in the distance between the surfaces.

Such colloid mills are considered very inefficient in subdividing solid particles. It has been found that colloid mills used under such conditions require a large amount of power and energy to achieve the breakdown of particles below five (5) microns in diameter and difficulty has been encountered in transmitting sufficient force to the particles to cause rupture. Thus, colloid mills previously hereto have been used generally for dispersing and redispersing of flocs of small primary particles to give suspensions; and, with differential velocities of the order of 10,000 feet to 12,000 feet per minute or higher, such shearing is obtained essentially by hydraulic means.

So that previously to this invention the general use of colloid mills has not been primarily as a particle size reduction means and it has been suggested that the use of the term colloid "mill" has been consequently a misnomer; and further it has been suggested prior hereto that colloid mills do not grind or reduce actual particles.

Thus the apparatus and processes known previously hereto and their disadvantage can be summarised as follows:

(a) In emulsifying methods whereby solids are first melted or dissolved in a liquid immiscible with a suspending liquid and emulsifying in a colloid mill or valve at high or ambient pressures then cooling, results in a product with a high mean particle size.

(b) Chemical methods previously proposed incur high costs through use of costly reagents, and very fine suspended material, from such processes is often contaminated with chemical by-products which require a further process to recover the desired product in a purified state; and some chemical methods previously proposed employ noxious gases or corrosive liquids which require elaborate plant to effect such chemical methods.

(c) In previously proposed wet grinding methods the total number of particles to which a disruptive force is applied at any one time is comparatively small such as in ball mills, tube mills, or mixing chambers charged with pebbles and provided with agitating paddles, and the yield of finely suspended particles is low in relation to power input.

(d) In previously proposed methods using colloid mills, with gaps between working surfaces below 0.020 inch, they have been characterised by low rates of yield of materials below five (5) microns, excessive wearing of working surfaces and development of excessive heat, while high power is required in relation to yield of finely suspended particles. Furthermore, colloid mills having working surfaces operating at the previously recognised distance of below 0.020 inch have required solid raw materials particles of a small size to be fed to the mill, which in fact results in a reduction in the rate of comminution.

An object of this present invention is to provide an improved apparatus and improved process of comminution and classification which process is continuous in a closed circuit and which includes a comminution apparatus of high efficiency with an inexpensive means of effecting the classification and concentration.

Another object of this present invention is to provide an improved apparatus by which the comminution and concentration of solid substances to a state where a minor portion of the solid substance is in the form of particles greater than five (5) microns and where a large portion of the solid substance when in liquid suspension is of colloidal dimensions exhibiting Brownian movement.

A further object of this present invention is to provide an improved apparatus for the comminution of solid substances for use in a continuous process whereby a proportion of the substance in the materials is reduced to particles less than five (5) microns and are continuously separated in a concentrated form from the larger particles.

A still further object of this present invention is to provide an improved apparatus for the comminution of solid substances for use in a continuous process whereby a proportion of the substance is reduced to particles less than five (5) microns in size and whereby the pressure developed by such improved apparatus is utilized to effect the classification and the concentration of the substance in the material.

According to this invention the improved process and improved apparatus for producing concentrated solid in liquid suspensions or redispersible materials from sulphur, or from dichloro-diphenyl-trichlorethane, or from like substances in a mixture of materials comprises feeding the mixture of materials having a substance of a size greater than fifty (50) microns and of a size up to the dimensions of the distance or the gap between the working surfaces of a size reducing means, size reducing a proportion of the substance in the mixture of materials by impact and/or by attrition to a size smaller than five (5) microns in a size reducing means having a distance or a gap between working surfaces of from thirty (30) thousandths of an inch to two hundred (200) thousandths of an inch and said working surfaces having relative movement of not less than twenty-five (25) metres per second, classifying and concentrating the size reduced substance in the mixture of materials and returning to the mixture being fed a major proportion of the substance, of a size greater than five (5) microns for further size reduction together with a proportion of the other admixed materials.

Further according to this invention the improved process and improved apparatus for producing concentrated solid in liquid suspensions or redispersible materials from sulphur, or from dichloro-diphenyl-trichlorethane, or from like substances in a mixture of materials provides for a continuous production of a dispersible or very fine substance such as sulphur by means including a size reducing means having working surfaces with a distance or gap of from thirty (30) thousandths of an inch to two hundred (200) thousandths of an inch and said surfaces having relative movement of not less than twenty-five (25) metres per second where the substance fed to the working surfaces has a size greater than fifty (50) microns and of a size up to the dimensions of the distance or gap between the working surfaces in that a quantity proportional to the amount of the coarse substance present in a mixture of materials is size reduced into very fine suspension in a given time, and consequentially where the concentration of the coarse substance in the mixture is increased, so that the rate of production of size reduced substance is increased to the limit of the capacity of the size-reducing means to cope with the amount of substance in the mixture, such amount being about 72% by weight for sulphur.

In this invention any portion of this process is to be considered continuous even if it is interrupted, so that it does not greatly destroy the effective continuity of the process as a whole; for example it is possible to feed the ingredients intermittently, either in regular or irregular cycles, and similarly operate the classifying step intermittently, either in regular or irregular cycles and either in step or out of step with the feeding operation while operating the reducing means continuously.

The accompanying drawing illustrates one convenient form of the improved apparatus in accordance with this invention, which drawing is a diagrammatic view of the improved apparatus.

The invention involving the improved process and improved apparatus will now be described with particular reference to the production of dispersible or very fine sulphur; but it is to be clearly understood that this invention may be applied to other like substances and to dichlorodiphenyl-trichlorethane as exemplified herein.

Thus in carrying this invention into effect in one convenient manner the improved apparatus is formed with hopper means 1 providing a supply for crystalline sulphur and providing a supply 2 of water and providing a supply 3 for a wetting and/or dispersing agent or agents: and the said hopper means 1 has a granular delivery means indicated at 6 and the water supply 2 and the wetting and/or dispersing agent or agents supply 3 have controllable faucets 4 and 5 respectively. The controlling means 6, 4 and 5 are arranged to deliver said ingredients and a delivery means 7 is provided for a returned proportion of oversize material so that, as stated hereafter, the sulphur in suspension in the mixture of ingredients in the apparatus is concentrated to a practical upper limit of about seventy-two percent (72%) by weight, and wherein the wetting and/or dispersing agent allows a very fine suspension of sulphur to be formed.

In order to start production in accordance with this process a quantity comprising a mixture of the ingredients having about sixty-six percent (66%) sulphur content is treated in the apparatus by circulating through size reducing means and cooling means until a desired percentage of the sulphur is in very fine suspension in the mixing chamber 8. To effect this initial production of very fine suspension means are provided for by-passing cooled material including a size reduced substance back to the mixing chamber, and such means may comprise a pipe line 18 with faucets 19, 20 which can be manipulated to stop the flow of the mixed materials to a classifying means and to allow the mixed materials with size-reduced substance therein to flow back and to enter the mixing chamber again. When a desired percentage of the sulphur is in very fine suspension in the mixing chamber 8 then the faucet 20 is closed and faucet 19 is opened and the material with size reduced substance flows to the classifying means 9.

In order to procure an economical production of dispersible or very fine sulphur, the coarse sulphur in suspension in the mixture of ingredients should be as concentrated as is practical since the more concentrated the coarse sulphur is in the mixture the greater is the rate of production; but as indicated above, a practical limit to such high rate of production is reached at about seventy-two percent (72%) by weight of sulphur in the mixture of the said ingredients provided the substance is not flocculated.

In accordance with this invention for the production of dispersible or very fine sulphur, a wetting agent is necessary to allow a suspension of sulphur to be formed in the mixture, as mentioned above; and a dispersing agent and/or protective colloid is necessary to stabilize the very fine suspension as it is formed, a preferred wetting and dispersing agent is sulphite lye and in the proportion of six percent (6%) of the sulphur present both the wetting and stabilization are accomplished, and the production of dispersible or very fine sulphur is satisfactory with pH value of substantially four (4) to five (5) at which the mixture is buffered by the sulphite lye. As an example the sulphite lye is preferably in a solution being a 50% to 60% solution used in proportion of approximately 1% to 10% of the sulphur in the mixed ingredients. Unless sufficient wetting and dispersing agent is present in the mixture of ingredients a reversion of colloidal suspension substance to coarser sizes or agglutinated or flocculated particles can occur, and, in accordance with this example, it is preferred to use a minimum of six percent (6%) by weight of sulphite lye to the weight of sulphur in the mixture to avoid this possibility including flocculation and lessening of fluidity which hinders classification and size reduction.

While in the foregoing dispersing agents have been referred to generally, it is to be understood that dispersing agents which increase the viscosity to a considerable extent are to be avoided.

A mixing container or chamber 8 open to atmosphere is placed to receive the said ingredients from their faucets and granular delivery means, and ingredients returned from a classifying means 9 and the mixing container or chamber 8 is provided with an agitator 10 having continuous operation to keep the ingredients mixed thoroughly.

An outlet 11 from the mixing container or chamber 8 delivers the mixture of ingredients to a size reducing means 12; and one convenient means for reducing part of the sulphur content in size to form dispersible or very fine suspension is by conveying the mixture from the mixing container or chamber 8 through a mill or mills 12 in parallel and/or in series, said mill or mills 12 having opposed working surfaces capable of having a relative movement of not less than twenty-five (25) meters per second, such as about fifty (50) meters per second.

We have found that large distances or gaps between the working surfaces in the mill or mills 12 for producing particles of the size desired are necessary for economical and efficient production of very fine sizes in contra-distinction to previously known and generally recognized distances; and distances and gaps between working surfaces in the mill or mills 12 of less than twenty-five (25) thousandths of an inch are less economical in producing particles of the size desired of dispersible or very fine sulphur in accordance with this invention.

Thus we have discovered that the important factor in gaining a high rate of production of desired dispersible or very fine sulphur is the distance or gap between the working surfaces of the mill 12, and it is desirable that the distance or gap be larger than the particle size of the substance in the material being fed to the mill 12; but a practical limit is reached, by the falling off of production, in treating sulphur where the said distance or gap is more than about one hundred (100) thousandths of an inch.

A further important factor discovered is that the rate of production decreases with a feed of finer sizes of particles of a said substance to almost negligible proportions for sulphur of five (5) to ten (10) micron particle size even with smaller distances between the working surfaces in the mill 12 appropriate to these sizes; and we found crystalline sulphur satisfactory, whereas flowers of sulphur, being easily reduced to particles of more or less uniform intermediate size, gave an almost negligible yield of very fine suspension even with prolonged treatment in the mill 12.

According to this invention the use of a mill 12 having a distance or gap between its working surfaces of a lower limit of thirty (30) thousandths of an inch up to one hundred (100) thousandths of an inch, or even up to two hundred thousandths of an inch, gives a high rate of production of dispersible or very fine sulphur from a mixture wherein 20 mesh sulphur having approximately a maximum particles size of thirty (30) thousandths of an inch is used; and, therefore, the preferred distance or gap between the working surfaces of a mill in this invention is between thirty (30) thousandths of an inch and one hundred (100) thousandths of an inch where the distance or gap between the working surfaces of the mill 12 is larger than the particles size of the substance in the material being fed to the mill 12.

In a mill 12, the temperature of the mixture increases as the latter is passed therethrough and milled, and complications in the condition of the treated substance may occur where the temperature is allowed to rise above approximately 45° C. where the substance being treated is sulphur having a melting point of 113° C.

Means for cooling the mixture during or after milling may comprise heat exchange means 13 which may comprise a cooling coil, water sprayed so that the milled and heated ingredients are cooled as they pass through the coils from which milled and cooled ingredients may be passed to the classifying means 9. It is also to be understood that refrigeration means may be used for gaining a quick cooling of the mixture and for maintaining a lower working temperature.

While in the drawing the heat exchange means 13 is shown between the size reducing means 12 and the classifying means 9, it is to be understood that the heat exchange means 13 may be situated in any convenient position whereby the temperature of the mixture in the mixing tank 8 is kept below 45° C. where the wetting and dispersing agent used is sulphite lye as specified in this specification.

The classifying means 9 in accordance with this invention is preferably a cyclonic apparatus (which is hereinafter termed a cyclone); and the dispersible or very fine suspension of sulphur which may be in a proportion of about twenty-eight percent (28%) of very fine sulphur to the total weight together with up to about five percent (5%) of sulphur having such a size greater than five (5) microns is conducted from the cyclone 9 to a holding tank or tanks, the first one of which may be a settling tank 14, where the size fraction of about 5 to 50 microns is settled as sludge. The greater part of the coarse sulphur, above 50 microns and including a small proportion of fine sizes in the liquid, discharges from a lower orifice of the cyclone (as mentioned below), and is returned by pipe 7 to the mixing container or chamber 8 for further mixing and further treatment as set forth previously.

It is to be understood that it is a feature of this invention that the size-reducing means delivers treated mixture under pressure to the cyclone 9 at a pressure which imparts sufficient velocity to effect size classification of the substance; and, in this invention, a delivery of treated mixture under pressure of about fifty (50) pounds to the square inch can be used for classification in the cyclone 9 (in the form of an inverted cone) with the dimensions for the interior of the cone having the diameter of the base of about three inches (3″), height of the cone about five inches (5″) and an inlet orifice of about one quarter of an inch (¼″) in diameter, said inlet orifice entering tangentially near the greatest diameter of the cone, and a bottom orifice (at the apex of the cone) of five eighths of an inch (⅝″) in diameter, and an upper orifice centrally in the base of half an inch (½″) in diameter.

Where in this example the classifying means 9 delivers from said upper orifice very fine suspension and sludge in excess of the rate of the addition of ingredients to the mixing container or chamber 8, then such excess of very fine suspension and sludge is by-passed back to the mixing container and chamber 8.

Means for use in by-passing the excess of very fine suspension and sludge to adjust the output in relation to the input may comprise a regulator in the delivery to the settling tank; and one convenient means for gaining such adjustment can comprise a constant head vessel 16 which passes a desired quantity of colloidal suspension and sludge in the output through a regulator 17; and the constant head vessel 16 also has an overflow discharging back into the mixing tank.

The improved means including a size reducing means provides for a continuous production of a dispersible or very fine substance such as in the example sulphur in that a quantity proportional to the amount of the coarse substance present in a mixture is being size reduced into very fine suspension in a given time, and where the concentration of coarse substance in the mixture is increased so the rate of production of fines is increased, until a practical limit is reached, such being governed by the capacity of the size-reducing means to cope with the amount of substance in the mixture, which amount is about 72% by weight for sulphur, for a size reducing means in accordance with this invention.

Where the sulphur is added to the mixture at the rate at which the size reducing means 12 can deal with and reduce sulphur to a finely divided material with any given percentage of sulphur in the mixture, a wetting and dispersing agent is added to wet the sulphur and to protect the fine particles as the latter are formed (6% of sulphite lye by weight) and water is also added so that the percentage of sulphur to the total added ingredients is that of the desired suspension plus the percentage of sludge in the output. Where the percentage of sulphur in the output i. e. suspension of fine sulphur and sludge, is less than the percentage of sulphur fed into the mixture, then more water is being removed from the mixture than is being fed into the mixture and more sulphur is being fed into the mixture than is being removed by the treatment in the classifying means 9 and regulating means 17. In such circumstances the percentage of sulphur in the mixture increases whereby the rate of production of fine sulphur increases until the amount of sulphur in the output of the product equals the amount of sulphur being fed in, and the percentage of sulphur in the output is equal to the percentage of sulphur in the input. While it is desirable to have a high percentage of sulphur in the mixture to attain a maximum rate of production, nevertheless it is necessary to produce colloidal suspension of sulphur below the maximum rate of production of the size-reducing means 12 to enable a balance between the input and output to be attained without going above the maximum percentage desirable for the size reducing means 12. On the other hand where the weight of sulphur in the output is greater than that being fed into the mixture, the percentage of sulphur in the mixture decreases, and when the output of sulphur becomes equal to the input of sulphur (allowing that the percentage of sulphur in the mixture is too low to sustain the rate of production of fine sulphur), then the percentage of sulphur in the output falls and the mixture increases in sulphur content, adjusting itself as stated above. For example in a mixture having sixty-six percent (66%) sulphur therein, the sulphur is formed into suspension of fine sulphur and sludge at the rate of 6.7 lbs. per minute of colloidal suspension of sulphur and about 1.3 lbs. per minute of sludge. In continuous operation the mixture in this example comprises sulphur fed in at the rate of 8 lbs. per minute, sulphite lye 0.5 lbs. per minute and water 15.5 lbs. per minute, and ingredients fed in at such rates and treated in a size-reducing means give a product being a suspension of sulphur particles less than five (5) microns in which the percentage of sulphur is twenty-eight percent (28%) in a total output of 24 lbs. per minute for all the ingredients. Then after conditioning with well known thickening and suspending agents and dilution as may be desired colloidal suspension containing twenty-five percent (25%) of sulphur can be obtained.

In this example the suspension of fine sulphur delivered into the storage tank 14 may be twenty-eight percent (28%) very fine sulphur having an average particle size of about 0.5 micron; but the percentage of fine sulphur in the container or chamber 8 varies between twelve percent (12%) and sixteen percent (16%) as the percentage of sulphur in the mixture in the mixing container or chamber 8 varies between sixty percent (60%) to seventy percent (70%).

Although in the example set forth previously, a product has 28% sulphur in suspension, it is to be understood that a product having a percentage of sulphur greater than 28% can be produced in accordance with this invention but at a comparatively slower rate of production.

From the holding tank 14 the very fine sulphur may be decanted off for concentrating, if necessary and if desired, by sedimentation or by evaporation in vacuo, or by centrifuging, or by coagulation and then redispersion. Where such suspension of fine sulphur is in a desired concentration, the consistency of the mixture may be increased by the addition of a suspending and/or thickening agent with or without a preservative, and a suitable suspending and/or thickening agent may be a cellulosic derivative such as methyl cellulose, or bentonite, or colloidal viscous material, or fibrous matter.

For increasing the consistency of the suspension the product together with the suspending and/or thickening agent can be forced such as by a pump (not shown) into a suitable means such as a colloid mill so that the two materials are homogenized therein; and the conditioned dispersible or colloidal sulphur is then ready for use as a fungicide or as an insecticide or for other suitable and desirable purposes. Other suitable means may be a homogenizer or an effective agitator.

Having now described this invention above herein with particular reference to the production of fine sulphur as suspensions or in a dispersible form we now describe one convenient manner in which a suspension or dispersible dichloro-diphenyl-trichlorethane having an average particle size as low as about one micron may be produced by using the same improved apparatus as illustrated in the accompanying drawing and as described for use in the production of dispersible or colloidal sulphur.

In order to start production in accordance with this process a quantity comprising the mixture of ingredients is added to the mixing chamber which may be in the following proportions:

| | Percent by weight |
|---|---|
| Dichloro-diphenyl-trichlorethane | 50 |
| Sulphite lye | 12½ |
| Water | 37½ |

It has been found that the dichloro-diphenyl-trichlorethane must be in a suitable state and one raw material which was found satisfactory was of coarse texture having a setting point of approximately 94° centigrade, and a reputed para para isomer content of about 80%.

The mixture of ingredients above described is homogenously agitated in the mixing chamber 8 and is circulated through the size reducing means 12 and cooling means 13, through by-pass 18 until a desired percentage of dichloro-diphenyl-trichlorethane is in the desired state of suspension. The by-pass 18 is then closed by closing faucet 20 and opening faucet 19; and then the hopper means 1, and supply means 2 and 3 and the classifying means are commenced operating, and the said means are adjusted so that the input of ingredients and their proportions by weight, and the output of ingredients and their proportions by weight in the suspension and sludge are approximately the same.

For example in a mixture containing a total of 50% dichloro-diphenyl-trichlorethane therein, and when about 50% of the total dichloro-diphenyl-trichlorethane present has been reduced to the desired particle size, the continuous operation is commenced and the dichloro-diphenyl-trichlorethane is size reduced at the rate of about 2.7 lbs. per minute and sludge at about 0.3 lbs. per minute. In continuous operation the mixture in the example comprises dichloro-diphenyl-trichlorethane fed in at the rate of 3 lbs. per minute, sulphite lye 0.375 lbs. per minute and water at 5.625 lbs. per minute and the ingredients fed in at such rates and treated in size-reducing means give a suspension after classification in which the percentage of dichloro-diphenyl-trichlorethane is 30% by weight in a total output of nine pounds, per minute.

In treating dichloro-diphenyl-trichlorethane a temperature of the mixed ingredients in the mixing chamber above 30° centigrade is not desirable, and we found that satisfactory results were obtained when the temperature is maintained at about 20° centigrade.

We found a distance or gap between the working surfaces of the size reducing means of 50 thousandths of an inch was satisfactory for this example.

What we do claim and desire to obtain by Letters Patent of the United States of America is:

1. The method for continuous production of finely divided sulfur as a concentrate in liquid having a particle size averaging less than about 5 microns from coarse particles averaging greater than 50 microns, comprising continuously forming a thick slurry of the coarse sulfur solids in water, mechanically disintegrating said slurry between mechanically working surfaces of a mill disposed with a gap having a clearance of from about .03 to .2 inch whereby a substantial portion of the particles are broken to a particle size of less than about 5 microns, classifying the ground slurry to remove a fraction having an average particle size of less than 5 microns, and recycling the larger particle size slurry residue together with as much larger particle size sulfur solids having a particle size exceeding about 50 microns as was removed as fine particle size slurry in said classification to said mill for a further comminution together with additional liquid suspending medium.

2. The method as defined in claim 1, wherein the mechanical disintegration of the sulfur is effected in the presence of a wetting agent.

3. The method as defined in claim 1, wherein the peripheral working speed between mechanical working surfaces of the mill is about 50 meters per second.

4. The method as defined in claim 1, wherein the size classification is effected centrifugally under the direct fluid pressure developed in the mechanical disintegrating step.

LAURIE OAKLEY BROWN.
TASMAN JOSEPH McKEE.

References Cited in the file of this patent

UNITED STATES PATENTS

| Number | Name | Date |
|---|---|---|
| Re. 16,191 | Povey | Oct. 27, 1925 |
| 1,458,542 | Plauson | June 12, 1923 |
| 1,774,609 | Myers | Sept. 2, 1930 |
| 1,969,242 | Szeguori | Aug. 7, 1934 |
| 2,060,210 | Heckert | Nov. 10, 1936 |
| 2,067,397 | Henninger | Jan. 12, 1937 |
| 2,348,736 | Heath | May 16, 1944 |

OTHER REFERENCES

Smith et al.: Ind. and Eng. Chem., April 1942, pages 490 to 493.